United States Patent
Dutta et al.

(10) Patent No.: US 6,826,694 B1
(45) Date of Patent: Nov. 30, 2004

(54) HIGH RESOLUTION ACCESS CONTROL

(75) Inventors: Partha P. Dutta, San Jose, CA (US); Mahesh M Kumar, Fremont, CA (US); Michah Lerner, Lakewood, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/422,952

(22) Filed: Oct. 22, 1999

Related U.S. Application Data

(60) Provisional application No. 60/105,188, filed on Oct. 22, 1998.

(51) Int. Cl.[7] .......................... G06F 11/30; G06F 15/173
(52) U.S. Cl. ........................................ 713/201; 709/224
(58) Field of Search ..................... 713/201, 200, 713/151, 152, 154; 709/224, 225, 229

(56) References Cited

U.S. PATENT DOCUMENTS

| | | | |
|---|---|---|---|
| 5,473,607 A | | 12/1995 | Hausman et al. ........ 370/85.13 |
| 5,983,270 A | * | 11/1999 | Abraham et al. ........... 709/224 |
| 6,219,706 B1 | * | 4/2001 | Fan et al. .................... 709/225 |
| 6,584,508 B1 | * | 6/2003 | Epstein et al. .............. 709/229 |

FOREIGN PATENT DOCUMENTS

| | | |
|---|---|---|
| EP | 0 762 707 A2 | 8/1997 |
| WO | 96/05549 | 2/1996 |

OTHER PUBLICATIONS

Bellovin, S..M., "Network Firewalls", IEEE Communications Magazine, vol. 32, No. 9, Sep. 1, 1994, pp. 50–57, XP000476555; p. 52, col. 1, ln. 60; p. 54, col. 2, ln 30.

* cited by examiner

*Primary Examiner*—Matthew Smithers

(57) ABSTRACT

A system and method for high resolution access control for packetized information. A packet is received at a firewall. A rule corresponding to header information in the packet prescribes referring the packet to an access control proxy. The access control proxy analyzes the contents of the packet, and identifies a rule based upon the contents. The rule is implemented at the firewall.

1 Claim, 3 Drawing Sheets

HIGH RESOLUTION ACCESS CONTROL

CROSS REFERENCE TO RELATED APPLICATION

This application claims priority to provisional application 60/105,188 entitled "HIGH RESOLUTION ACCESS CONTROL," filed Oct. 22, 1998, the contents of which are incorporated herein by reference.

FIELD OF THE INVENTION

The field of the invention is information systems access control, and in particular high resolution filtering of packetized information.

BACKGROUND OF THE INVENTION

A firewall regulates the flow of packetized information. A packet includes a header and a payload. The header includes header parameters, including a source and destination address for the packet, as well as source and destination port numbers and a protocol number. Other examples of header parameters include various flags (e.g., security features implemented with respect to the packet (AUTHENTICATED, ENCRYPTED), quality of service requirements (e.g., HIGH, MEDIUM, LOW) for handling the packet, a priority parameter for handling the packet (e.g., ROUTINE, URGENT, FLASH), etc.) The payload includes the data meant to be conveyed by the packet from its source to its intended destination.

A known firewall is placed between the packet's source and intended destination, where it intercepts the packet. The known firewall filters a packet based upon the packet's header parameters and a rule loaded into the firewall. The rule correlates a pattern in the header of a packet with a prescribed action, either PASS or DROP. The filter identifies the rule that applies to the packet based upon the packet's header, and then implements the rule's prescribed action. When a DROP action is performed, the packet is blocked (deleted), and does not reach its intended destination. When a PASS action is performed, the packet is passed on toward its intended destination. The set of rules loaded into a firewall reflect a security policy, which prescribes what type of information is permissible to pass through the firewall, e.g., from which source, to which destination, for which applications, etc.

The set of rules loaded into a known firewall operate at a low level of resolution. As described above, a firewall rule prescribes a PASS or DROP action based only upon the header parameters of the packet. Packet header parameters alone do not reveal the ultimate target of, for example, a connection request from a sender to a destination host. For example, a HyperText Transfer Protocol (HTTP) connection request to send the file located at http://www.att.com/secret.html is not entirely disclosed in the header of the packet initiating the request. The header reveals the Internet Protocol (IP) address of the proxy corresponding to the domain name att.com. However, information regarding the particular file that is being requested, secret.html, is embedded in the payload of the packet. Since known firewalls only filter packets based upon their header parameters, known filters cannot PASS or DROP a packet on the basis of a particular file at a given destination. The same shortfall in known filters exists for filtering a packet destined for a particular newsgroup, chat session, e-mail address, etc.

SUMMARY OF THE INVENTION

The present invention provides high resolution access control for packetized information. In accordance with one embodiment of the present invention, a packet is received at a firewall and referred to an access control proxy. The access control proxy analyzes the contents of the packet, and identifies an access rule based upon the contents. The action prescribed by the access rule is performed with respect to the packet and any related packets. This advantageously provides for filtering a packet based not only upon its header information, as in known firewalls, but upon the information contained in the packet payload.

DETAILED DESCRIPTION

Figure 1:
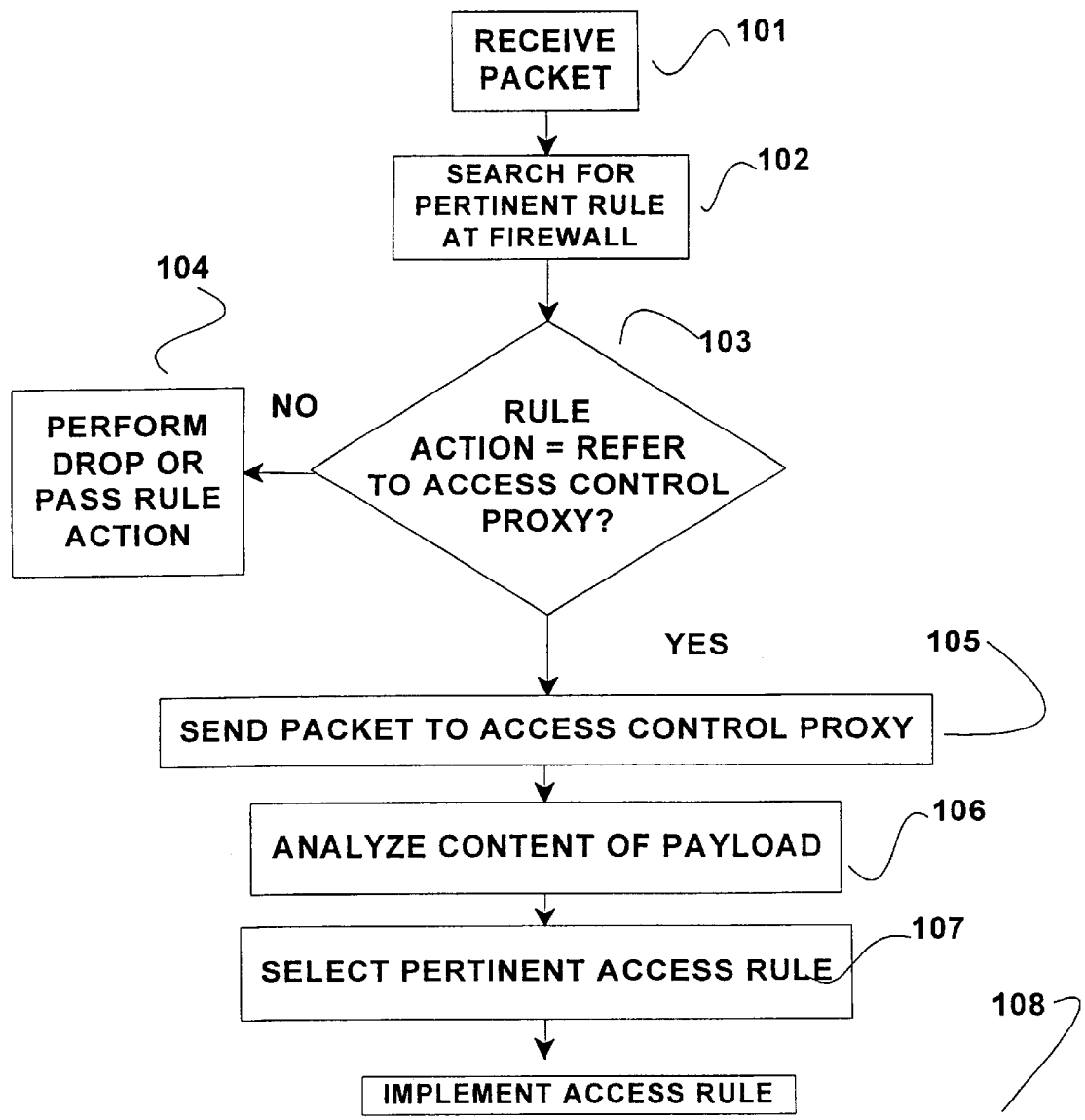
FIG. 1 is a flow chart showing the method in accordance with an embodiment of the present invention.

A flow chart showing the method in accordance with an embodiment of the present invention is shown in FIG. 1. A packet is received at a firewall, step 101. The packet has at least one header parameter and a payload. As discussed above, a packet is a discrete unit of information. In one embodiment of the present invention, a packet includes a header and a payload. The header includes header parameters, such as source address, source port, destination address, destination port and protocol number. The payload of the packet includes data being conveyed by the packet, e.g., a connection request, document data, etc. An example of a packet is an Internet Protocol (IP) packet, described in RFC 791, <http://www.library.ucg.ie/CIE/RFC/791/index.htm, visited Sep. 23, 1998>.

After the packet is received, an access rule is identified that corresponds to at least one header parameter of the packet. In one embodiment, this access rule is stored locally at the firewall. In another embodiment, this access rule is obtained from a node external to the firewall.

In accordance with an embodiment of the present invention, the action prescribed by the rule that corresponds to the received packet's header information indicates that the packet is to be referred to an access control proxy. In one embodiment, the access control proxy is specific to a single protocol, e.g., the file transfer protocol (FTP), the hypertext transfer protocol (HTTP), newsgroup protocol, etc.

The access control proxy selects an access rule based upon the contents of the packet. In one embodiment, the access rule is stored locally at the firewall. In another embodiment, the access rule is retrieved from a node external to the firewall. In one embodiment, the access rule is selected based upon the name of the requested file. In another embodiment, it is selected on the basis of the URL of the requested information. For example, an access rule can be selected based upon the domain name of the requested information, or the nth degree domain name of a URL in a packet payload. The "nth degree domain name" is defined as follows: a domain name is comprised of text strings separated by periods, e.g., a.b.c.d.e. The rightmost string (e.g., "e" in the example) is the first degree domain name, the string immediately to the left on the other side of the period is the second degree domain name (e.g., "d" in the example), and each string further to the left is incremented by one degree. Thus, "c" is the third degree domain name, "b" is the fourth degree, etc.

After selecting the access rule based upon the contents of the packet, the access rule is implemented for that packet and any related packets. A related packet, for example, is another packet in the same session request as the first packet. For example, a session is likely to include many packets. The packet or packets that contain sufficient payload information for the access proxy to select a corresponding access rule will be PASSED or DROPPED in accordance with the selected access rule, as will any other packets that comprise the connection request.

This process is shown in more detail in FIG. 1. A packet is received, step 101. The set of rules stored at the firewall is searched for a rule that pertains to the header parameters of the packet, step 102. When such a rule is identified, it is determined if the prescribed action of the rule is to refer the packet to an access control proxy, step 103. If the prescribed action is not to refer the packet, the action is to PASS or DROP the packet, which is performed for the packet, step 104. If the prescribed action is to refer the packet, the packet is then sent to the access control proxy, step 105. In one embodiment, the access control proxy analyzes the content of the packet payload to determine details not available from the header parameters as to the information which the payload requests, step 106. In another embodiment, the access control proxy analyzes the contents of a plurality of received packets to determine details pertaining to a request for information that is constituted by the plurality of payloads. The number of packet analyzed is sufficient to select an access rule pertaining to the detailed information request, i.e., to decide whether to PASS or DROP the packets pertinent to the request.

The access control proxy then selects an access rule pertaining to the detailed information request contained in the packet payload, step 107. For example, an access rule prescribes a DROP action for any packet that requests the file located at http://www.att.com/secret.html. On the other hand, an access rule prescribes a PASS action for any packet that requests the file located at http://www.att.com/public.html.

In one embodiment of the present invention, the access control proxy selects an access rule that pertains to the packet based both on an analysis of the payload and the header parameters of the packet. For example, the source address of the packet is included in the header as a header parameter. In one embodiment, the access control proxy selects an access rule that prescribes a DROP action for any packet that requests the file http://www.att.com/secret.html and whose header indicates the packet is from SOURCE A, whereas another selected access rule prescribes a PASS action for any packet that requests the same file, but whose header indicates the packet is from SOURCE B.

In one embodiment of the present invention, the access control proxy then implements the selected access rule for the packet, performing either a PASS or a DROP action with respect to the packet, in accordance with the access rule, step 108.

Figure 2:
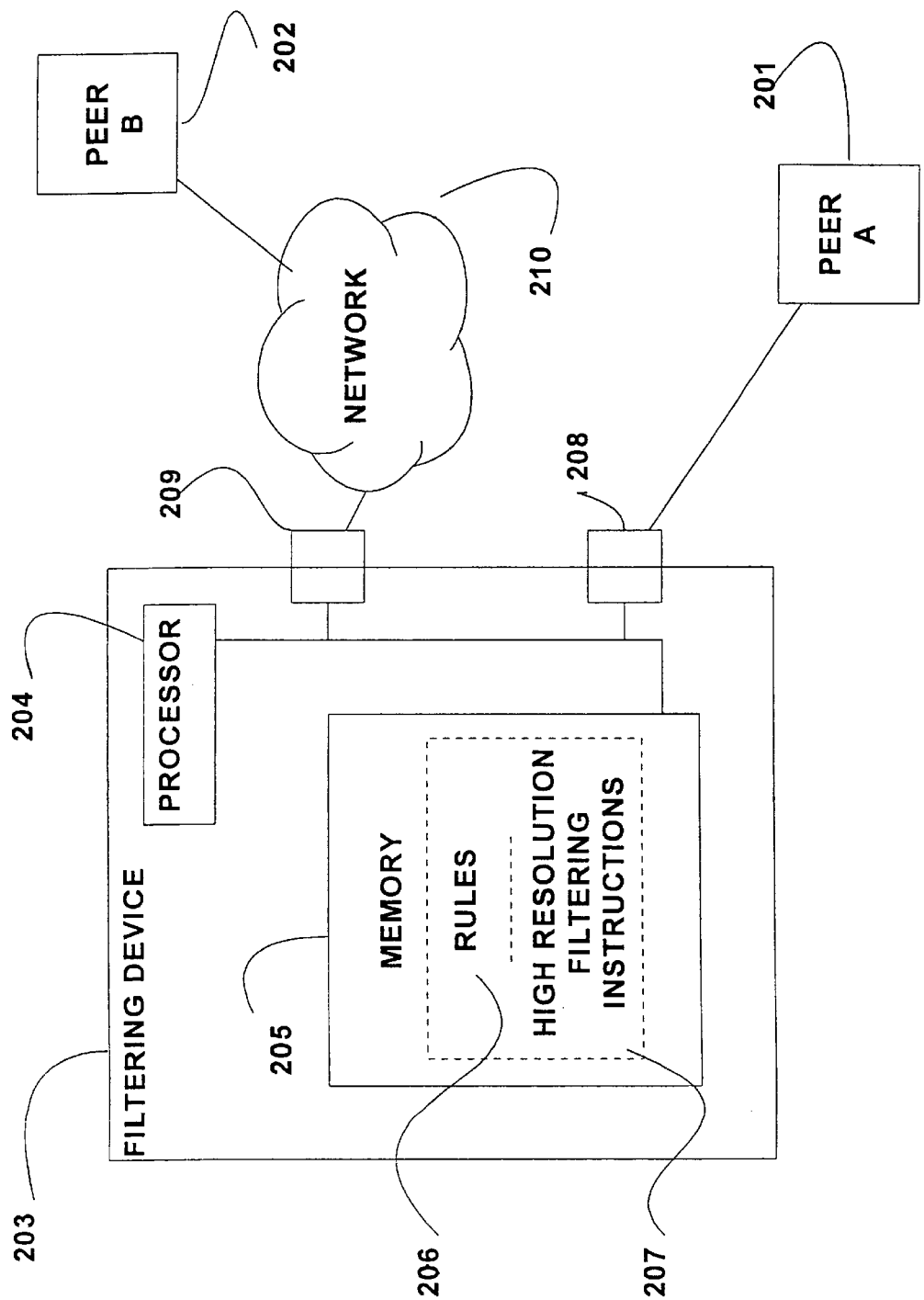
FIG. 2 shows an apparatus in accordance with an embodiment of the present invention.

An apparatus in accordance with an embodiment of the present invention is shown in FIG. 2. Peer A 201 (the sender) sends a packet of information addressed to destination Peer B 202 (the destination) through filtering device 203. The packet payload includes an identifier of a file (e.g., a filename and directory information) requested by peer A 201 and stored at peer B 202. Filtering device 203 comprises a processor 204, a memory 205 that stores rules 206 (e.g., both rules that refer a packet to the access control proxy and access rules that are selected by the access control proxy) and high resolution filtering instructions 207 adapted to be executed by processor 204 to perform steps of the method in accordance with an embodiment of the present invention. The filtering device 203 also includes a first port 208 through which the packet is received from Peer A 201, and a second port 209 through which the packet will pass to Peer B 202 through network 210 if the pertinent rule prescribes a PASS action with respect to the packet.

Peers 201 and 202 are each a computer with a permanent or temporary network address. Network 210 is any information systems network across which the information in the packet can be sent. Examples of network 210 include the Internet, an intranet, a virtual private network, etc.

In one embodiment, processor 204 is a general purpose microprocessor, such as the Pentium II microprocessor manufactured-by the Intel Corporation of Santa Clara, Calif. In another embodiment, processor 204 is an Application Specific Integrated Circuit (ASIC), which has been specifically designed to perform at least some of the steps of the method in accordance with an embodiment of the present invention. ASICs are well-known in the art for application such as digital signal processing. In an embodiment of the present invention that includes an ASIC, at least part of the high resolution filtering instructions 207 can be implemented in the design of the ASIC.

Memory 205 can be Random Access Memory (RAM), a hard disk, a floppy disk, an optical digital storage medium, or any combination thereof. Memory 205 is meant to encompass any means for storing digital information.

High resolution filtering instructions 207 are adapted to be executed by processor 204 to receive a packet, refer the packet to an access control proxy, select an access rule base upon the contents of the payload of the received packet, and then implement the access rule by performing the action (typically PASS or DROP) prescribed by the selected rule with respect to a packet. The term "high resolution filtering instructions" is meant to include access control proxy instructions. In one embodiment, the access rule is retrieved based upon a combination of the contents and header parameters of the packet. In another embodiment, the access rule is selected based upon the contents of one or several packet payloads.

In one embodiment of the present invention, high resolution filtering instructions 207 include firewall instructions and access control proxy instructions. In one embodiment, the firewall instructions are executed on processor 204 as a firewall process, and the access control proxy instructions are executed on processor 204 as an access control proxy process. When filtering device 203 receives a packet, the firewall process searches for and identifies a rule pertinent to the packet. The rule prescribes an action, either PASS, DROP or to REFER the packet to an access control proxy. In one embodiment of the present invention, there is a distinct access control proxy for each different protocol to which a packet can conform, e.g., HTTP, FTP, e-mail, newsgroup, telnet, etc. The protocol of a packet in one embodiment is indicated as a protocol number in the packet header. An embodiment of the present invention advantageously uses the protocol number in the header to refer a packet to the correct access control proxy process.

When a packet is referred to an access control proxy process, the proxy process analyzes the contents of the packet and selects an access rule based upon the results the content analysis. In one embodiment, the selected access rule is stored locally. In another embodiment, the selected access rule is retrieved from an external database. In yet another embodiment, the access rule is dynamically formulated by the proxy. The access rule is implemented at the firewall.

In one embodiment of the present invention, several (more than one) packets are referred to the access control proxy process. The access control proxy process analyzes the contents of the several packets, and selects an access rule based upon the results of this analysis. In one embodiment, the information needed to select an access rule is spread across the contents of the several packets, and may not be contained in any one of the several packets alone. Thus, in one embodiment, the contents of a packet may be represented as:

Packet: SELECT_RULE_1432

This shows that there is sufficient information in the single packet to identify the rule that should be selected. On the other hand, consider four packets that contain the following information:

Packet 1: SELECT_RULE_FIRST_DIGIT_1
Packet 2: SELECT_RULE_SECOND_DIGIT_4
Packet 3: SELECT_RULE_THIRD_DIGIT_3
Packet 4: SELECT_RULE_FOURTH_DIGIT_2

The above example is primarily heuristic. Another example arises when several packets need to be analyzed to determine what type of message is being carried by the packets, and where traffic is regulated through the firewall based upon the type of message being carried.

In one embodiment, there are a plurality of ports to and from numerous destinations. The port or ports that communicate packets to and from filtering device 203 are meant to encompass any number or configuration of ports. The port configuration is expected to vary to suit the particular connectivity required of a filtering device 203 in a given situation, i.e., in a given context or architecture in which parties communicate through filtering device 203.

Figure 3:
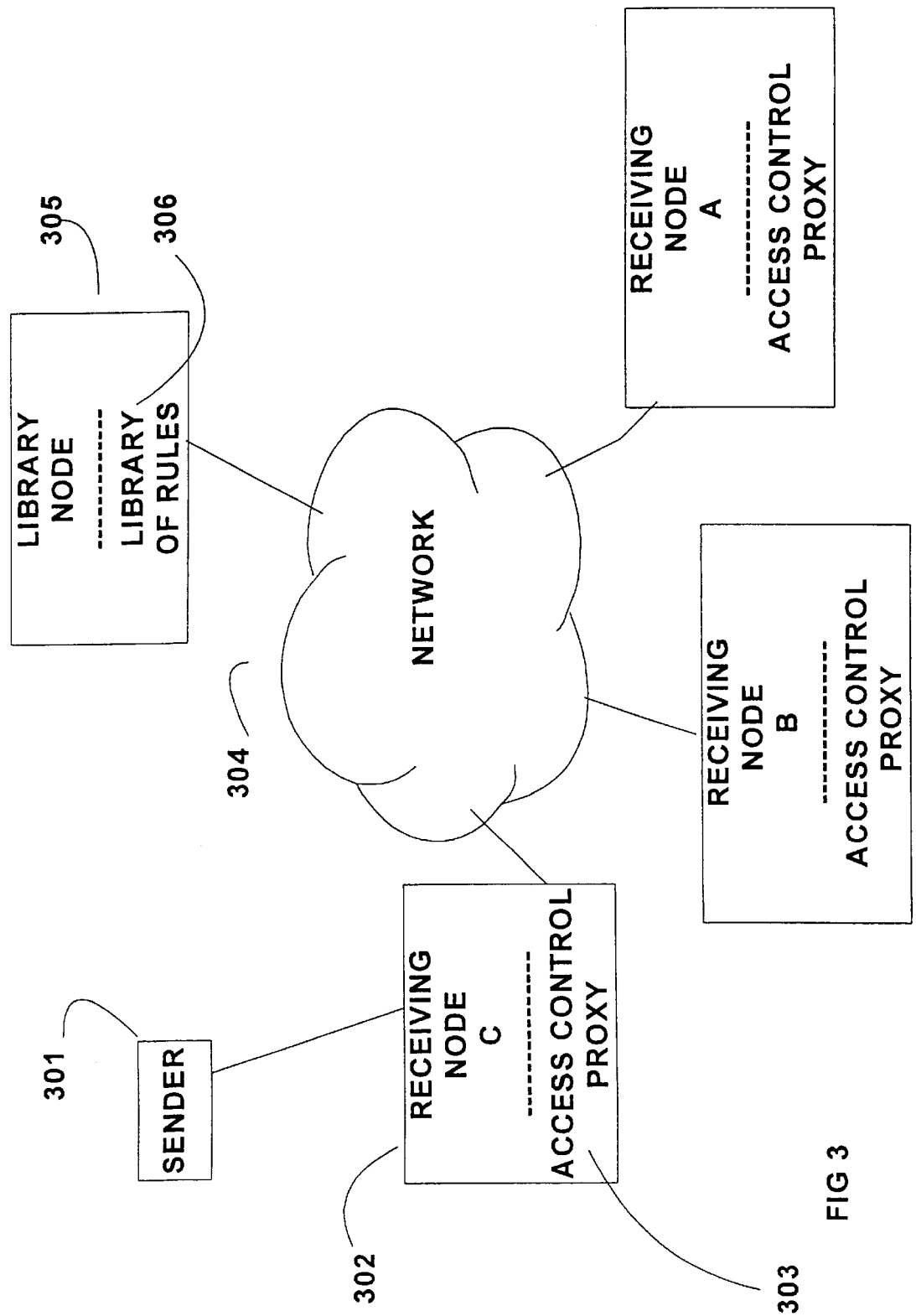
FIG. 3 shows a system in accordance with the present invention.

In various embodiments, the functions of the present invention are performed on separate nodes. In one embodiment shown in FIG. 3, a packet is received from a sender 301 at one of a plurality of receiving nodes 302, which node 302 then refers the packet to a locally executing access control proxy 303. If the local access control proxy 303 does not store a rule corresponding to the contents of the packet, it sends a query through network 304 to another separate node 305 that can advantageously function as a central library that stores a large number of access rules 306, only some of which may be needed at any one time by the plurality of receiving nodes 302. The library node 305 identifies the pertinent access rule from its collection of access rules 306, and then sends it to the access control proxy at the requesting receiving node 302, which then implements it. This illustrates the advantageous scalability of the present invention. Only relatively few library sites (in relation to the number of receiving nodes) need store large numbers of access rules.

In another embodiment, the firewall is on a receiving node 302, and performs firewall functions, including receiving a packet (using a rule), referring the packet to the access control proxy, and implementing an access rule. The access control proxy is on another node 305, and there performs proxy functions including analyzing the packet and selecting an access rule, which it then sends to the receiving node 302 to implement. In other words, the firewall functions can be performed by a different processor than processor that performs the proxy functions.

A medium that stores instructions adapted to be executed on a processor, like memory 205, is meant to encompass any medium capable of storing digital information. Examples of a medium that stores instructions include a hard disk, a floppy disk, a Compact Disk Read Only Memory (CD-ROM), magnetic tape, flash memory, etc.

The term "instructions adapted to be executed" is meant to encompass more than machine code. The term "instructions adapted to be executed" is meant to encompass source code, assembler, and any other expression of instructions that may require preprocessing in order to be executed by processor. For example, also included is code that has been compressed or encrypted, and must be uncompressed and/or unencrypted in order to be executed by a processor.

The present invention advantageously provides a more efficient, flexible and scalable system and method for implementing the rules of a security policy or policies at a filtering device, because a rule is only loaded at the filtering device when the rule is needed.

What is claimed is:

1. A method for filtering a packet, including the steps of:
   a. receiving a packet having at least one header parameter and a payload;
   b. selecting an access rule based upon the contents of the payload of the packet received in step a;
   c. implementing the access rule for a packet, wherein the access rule is selected based upon a combination of the contents of the packet received in step a and the contents of at least one other packet.

* * * * *